(No Model.) 2 Sheets—Sheet 1.

T. H. SANDERSON.
COUPLING FOR BICYCLES.

No. 596,383. Patented Dec. 28, 1897.

WITNESSES:

INVENTOR
T. H. Sanderson
BY
ATTORNEYS.

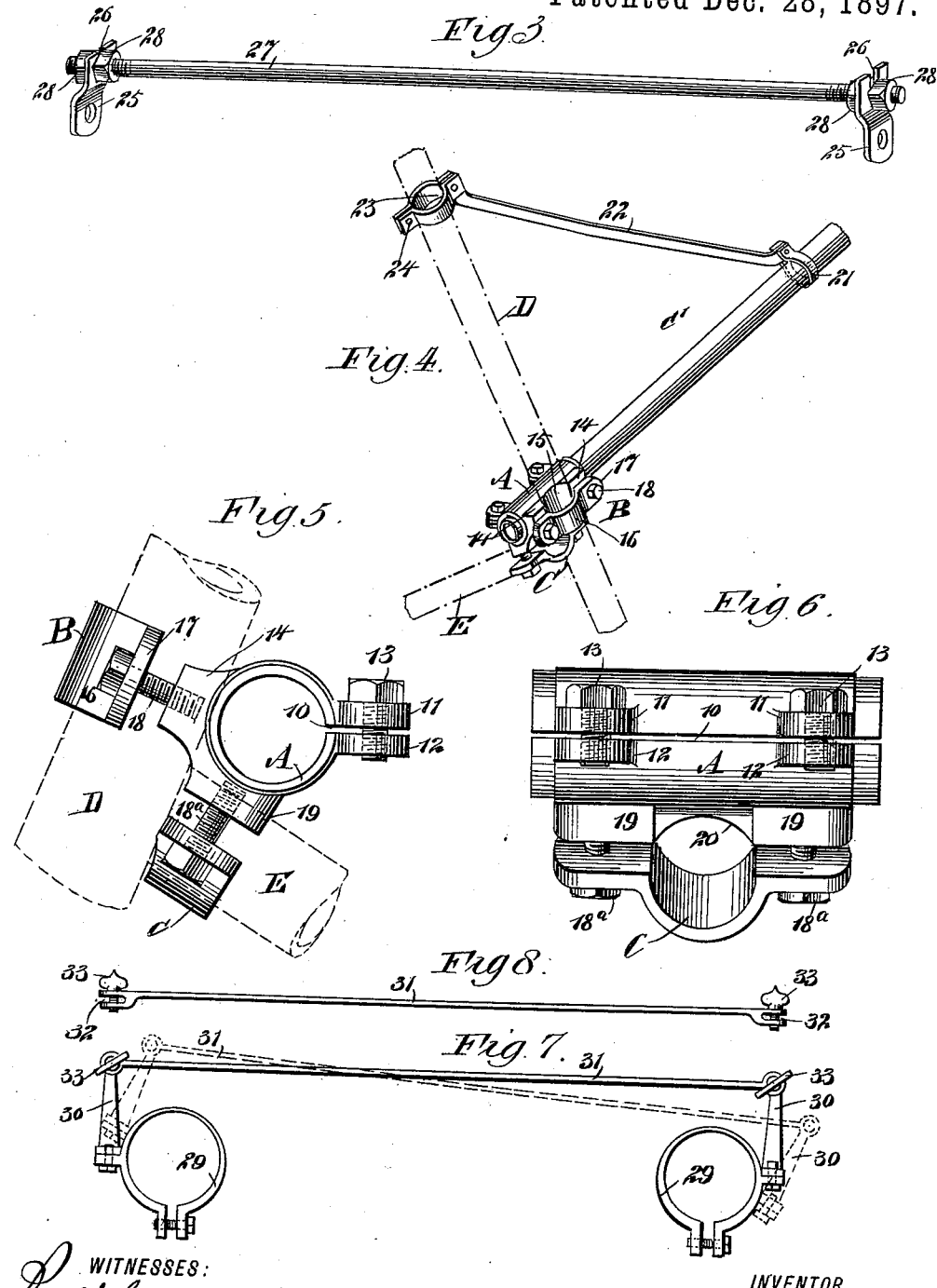
(No Model.) 2 Sheets—Sheet 2.
T. H. SANDERSON.
COUPLING FOR BICYCLES.
No. 596,383. Patented Dec. 28, 1897.

UNITED STATES PATENT OFFICE.

THOMAS H. SANDERSON, OF NEW YORK, N. Y.

COUPLING FOR BICYCLES.

SPECIFICATION forming part of Letters Patent No. 596,383, dated December 28, 1897.

Application filed July 16, 1896. Serial No. 599,364. (No model.)

*To all whom it may concern:*

Be it known that I, THOMAS H. SANDERSON, of New York city, in the county and State of New York, have invented a new and Improved Coupling for Bicycles, of which the following is a full, clear, and exact description.

The object of this invention is to provide simple, durable, and easily-manipulated devices for coupling two bicycles together, so that they will be virtually one vehicle, the coupled bicycles traveling parallel, and whereby also when the steering device of one of the wheels is operated the steering device of the wheel coupled therewith will be operated simultaneously in the same manner.

Another object of the invention is to construct the coupling in such manner that it will comprise the smallest number of parts and be exceedingly light and strong, and whereby sundry of the parts may be permitted to remain on the frame of a bicycle, or all of the parts of the coupling may be expeditiously and conveniently detached from the bicycle, if desired.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in all the figures.

Figure 1:
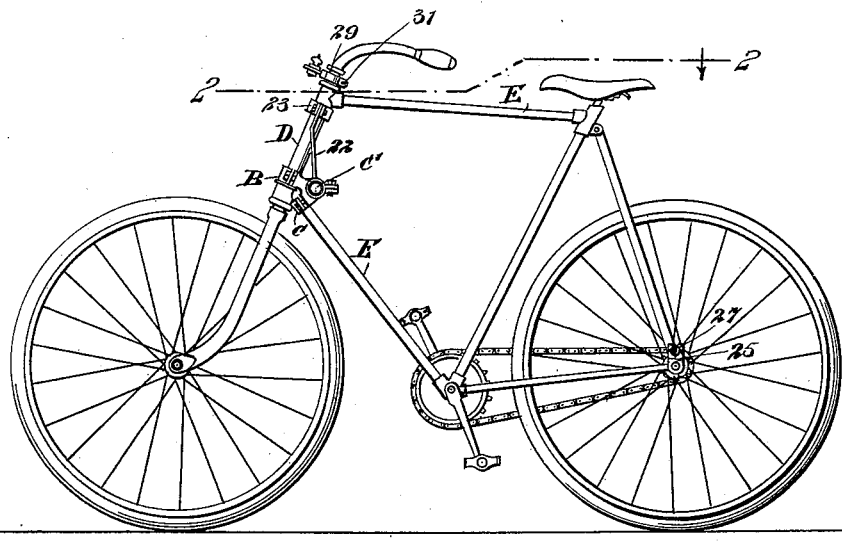
Figure 2:
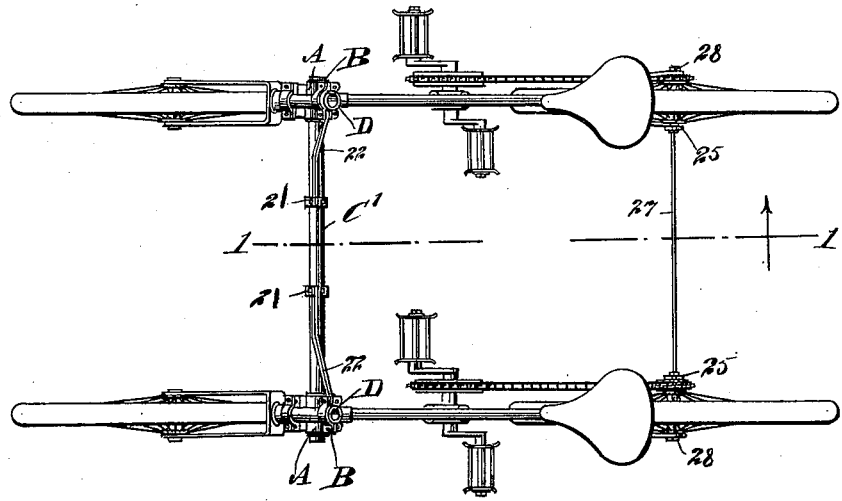

Figure 1 is a section through the couplings of coupled bicycles, the section being taken on the line 1 1 of Fig. 2. Fig. 2 is a plan view of two bicycles and the couplings connecting the same, the heads of the bicycle-frames being in section, as indicated by the line 2 2 in Fig. 1. Fig. 3 is a perspective view of the connecting-bar employed for the rear portion of the bicycle-frame. Fig. 4 is a perspective view of one end of the front upper coupling-bar and the coupling-fitting which is to be applied to the bicycle-frame. Fig. 5 is an end view of the said fitting. Fig. 6 is a rear elevation of the frame-fitting shown in Fig. 5. Fig. 7 is a plan view of the coupling for the handle-bar stems of the two bicycles, and Fig. 8 is a front elevation of the coupling-bar shown in Fig. 7.

The main fitting for the frame of the bicycles is that which is shown in Figs. 5 and 6, and this fitting consists of a split sleeve A, arranged transversely to the plane of the machine, the opening 10 whereof is made longitudinally in the sleeve at the back, and at the top and bottom of this opening 10, near each end of the opening, lugs 11 and 12 are formed, one below the other, and the two lugs may be drawn together, so as to contract the sleeve through the medium of set-screws 13 or like devices.

The sleeve A, it will be observed, is open-ended, so that the coupling-bar can be passed through the same from either side, as hereinafter described.

On the front part of the sleeve A, near each end, a lug 14 is made, and the two lugs are connected by a concaved bridge 15, the bridge and lugs being ordinarily made integral, and the combined bridge and lugs are adapted to receive a cap B. This cap consists of an arched section 16, corresponding to the curvature of the bridge 15 and straight foot-pieces 17, which are to rest against the upper faces of the lugs 14, and the foot-sections and the lugs 14 may be brought tightly together through the medium of set-screws 18.

At the bottom of the body-sleeve A lugs 19 are formed corresponding to the lugs 14 and connected by a light concaved bridge 20, and the front bridge and the lugs are adapted to receive a cap C, correspondingly constructed to the upper cap B and secured to the bottom lugs by set-screws 18ᵃ, as shown in Fig. 5. This fitting may remain permanently on a bicycle, if so desired.

The head D of the bicycle is passed through the opening between the front bridge 15 and the arched portion of the front cap, and the cap is then fastened firmly to the body of the fitting. The lower front brace E is in like manner passed through the opening formed by the lower bridge 20 of the fitting and the arched portion of the under cap C, and the upper cap is then firmly secured to the fitting. The fitting thus made will be self-bracing, since the sleeve is secured firmly both to the head and lower front brace, which are at an angle to each other, so that no matter in what direction the strain is brought upon the coupling-sleeve it is effectually resisted by one or the other of the clamps which secure the sleeve to the two said parts of the bicycle, and consequently there is little or no need of additional braces for the coupling-bar.

A coupling-bar C' is used in connection with the fittings of the two bicycles that are to be connected, and the ends of the bar are passed through the body-sleeves A of the fittings, the latter being permitted to expand, and when the coupling-bar C' is adjusted the body-sleeves A are contracted to firmly hold the coupling-bar in the desired position. Sleeves 21 may be loosely mounted on the front coupling-bar C', which is the main coupling-bar, a sleeve being placed near each end of the said bar, and each sleeve is pivotally connected with a brace 22, and at the upper end of each brace a sectional collar 23 is placed, the sections being adapted to be passed around the head of the bicycle-frame adjacent to the upper frame-brace and to be drawn together by set-screws 24. In this manner the fronts of the two bicycles will be firmly connected.

In order that the two bicycles shall not separate at the rear, a coupling is provided for this portion, and to that end a bracket 25 is permanently secured upon the axle of the rear wheel at that end which is to face the opposing wheel, the bracket having a slot 26 in its upper end. When the wheels are to be coupled, a rod 27, threaded at its ends, is dropped in the slots 26 of the brackets 25, and lock-nuts 28 are screwed on the said rod to engage with the outer and inner faces of the brackets, as shown in Fig. 3.

It is also necessary that the handle-bars of the two wheels shall operate simultaneously and in unison. To that end clips 29 are provided, which are secured upon the stems of the handle-bars of the two machines, and each clip is provided, preferably, at its outer side with a forwardly-extending arm 30, rigidly attached to the clip, and a coupling-bar 31 is employed to connect the arms 30, the said coupling-bar, as shown in Fig. 8, having bifurcated ends 32, and the outer extremities of the arms 30 are passed between the members of the bifurcated parts and are held therein by set-screws 33, so that when the handle-bar of one wheel is turned to the right the handle-bar of the connected wheel will be turned simultaneously in the same direction.

It is evident that a coupling of the above character may be quickly removed from or attached to two machines to make them travel side by side similar to a single four-wheeled vehicle, and that the parts may be made so light as not to add materially to the weight of the machines, and that sundry of the parts may be left on the machines without detracting from the appearance of either.

Having thus described my invention, I claim as new and desire to secure by Letters Patent—

The herein-described improvement in couplings for bicycles, consisting of the combination with a self-bracing fitting comprising an open-ended sleeve arranged transversely to the plane of the machine and adapted to receive a coupling-bar, and having clamps thereon for securing the sleeve firmly both to the head and lower front brace of the bicycle, of a coupling-bar held by said sleeve and means for clamping the sleeve to said bar, substantially as and for the purpose set forth.

THOMAS H. SANDERSON.

Witnesses:
J. FRED. ACKER,
JNO. M. RITTER.